United States Patent [19]

Slack et al.

[11] Patent Number: 5,043,473

[45] Date of Patent: Aug. 27, 1991

[54] LIQUID ISOCYANATE PREPOLYMERS

[75] Inventors: William E. Slack, Moundsville; Clarence D. Blue, New Martinsville, both of W. Va.

[73] Assignee: Mobay Corporation, Pittsburgh, Pa.

[21] Appl. No.: 193,306

[22] Filed: May 11, 1988

[51] Int. Cl.$^5$ ............................................ C07C 251/00
[52] U.S. Cl. ................................................ 560/359
[58] Field of Search ........................................ 560/359

[56] References Cited

U.S. PATENT DOCUMENTS

| 4,292,255 | 9/1981 | Hennig et al. | 560/351 |
| 4,611,083 | 9/1986 | Buethe et al. | 560/351 |
| 4,686,242 | 8/1987 | Turner et al. | 521/137 |
| 4,689,356 | 8/1987 | Peffley et al. | 521/159 |
| 4,705,814 | 11/1987 | Grigsby et al. | 521/159 |

Primary Examiner—Alan Siegel
Attorney, Agent, or Firm—Joseph C. Gil

[57] ABSTRACT

The present invention is directed to a liquid, storage-stable isocyanate prepolymer having an isocyanate group content of from 10 to 30% by weight, prepared by reacting:

i) a polyamine containing at least two aromatically bound primary amino groups prepared by hydrolyzing an isocyanate compound having an isocyanate group content of from 0.5 to 40% by weight, with ii) an isocyanate mixture comprising
  a) from 50 to 100% by weight of diphenylmethane diisocyanates of which from 3 to 50% by weight consist of the 2,2'- and 2,4'-isomers, and
  b) the balance being polyphenylpolymethylene polyisocyanates, with the proviso that if said mixture comprises from 95 to 100% by weight of diphenylmethane diisocyanate, at least 15% by weight of said diisocyanate consisting of the 2,2'- and 2,4'-isomers.

3 Claims, No Drawings

LIQUID ISOCYANATE PREPOLYMERS

BACKGROUND OF THE INVENTION

Urea group-containing polyisocyanate mixtures which are liquid at room temperature are known. See U.S. Pat. No. 4,611,083. Such mixtures are described as being prepared by reacting polyoxyalkylene polyamines having functionalities of from 2 to 5 and amine numbers of from 20 to 250 with specific polyisocyanates based on diphenylmethane diisocyanate. The polyisocyanates used are selected from the group consisting of (i) at least one diphenylmethane diisocyanate isomer and (ii) a mixture of diphenylmethane diisocyanates and polyphenyl polymethylene polyisocyanates where the diisocyanate content of the mixture is from 55 to 90 weight percent. See also U.S. Pat. No. 4,689,356. Similar products are described in U.S. Pat. No. 4,705,814, but the isocyanate used is an aliphatic isocyanate.

It is also known that diphenylmethane diisocyanate and its higher derivatives can form stable prepolymers with primary amine terminated materials having a degree of amination of from about 25 to 85% and with secondary amine-terminated materials having a degree of amination of from 25 to 100%. See U.S. Pat. No. 4,686,242. The amines described in this reference are prepared by reacting a hydroxyl-terminated polyether with hydrogen and ammonia or a primary amine in the presence of catalysts to reductively aminate the polyether.

DESCRIPTION OF THE INVENTION

The present invention is broadly directed to a liquid, storage stable, isocyanate prepolymer prepared by reacting (i) a polyamine containing at least two aromatically bound primary amino groups, prepared by hydrolyzing an isocyanate compound having an isocyanate group content of from 0.5 to 40% by weight, with (ii) an isocyanate mixture comprising: (a) from 50 to 100% by weight of a diphenylmethane diisocyanate of which from 3 to 50% by weight consists of the 2,2'- and 2,4'-isomers and (b) the balance being polyphenylpolymethylene polyisocyanates, with the proviso that if said mixture comprises from 95 to 100% by weight of diphenylmethane diisocyanates, at least 15% by weight of said diisocyanate consists of the 2,2'- and 2,4'-isomers, wherein said liquid prepolymer has an isocyanate group content of from 10 to 30% by weight.

The liquid prepolymers of the invention can be heated to a temperature of from 80° to 200° C. for from 1 to 90 minutes thereby producing a product containing biuret groups or biuret and allophanate groups. The isocyanate group content of the resultant product is generally from 10 to 27% by weight.

The polyamines useful in the present invention are prepared by hydrolyzing an isocyanate compound having an isocyanate group content of from 0.5 to 40% by weight. The most preferred polyamines are prepared by first reacting a polyether containing two to four hydroxyl groups with an excess of an aromatic polyisocyanate to form an isocyanate terminated prepolymer and then converting the isocyanate groups to amine groups by hydrolysis. Processes for the production of useful polyamines via isocyanate hydrolysis techniques are described in U.S. Pat. Nos. 4,386,318, 4,456,730, 4,472,568, 4,501,873, 4,515,923, 4,525,534, 4,540,720, 4,578,500 and 4,565,645, European Patent 0,097,299 and German Offenlegungsschrift 3,948,419, all the disclosures of which are herein incorporated by reference. Similar products are also described in U.S. Pat. Nos. 4,506,039, 4,525,590, 4,532,266 and 4,532,317 and in U.S. applications Ser. Nos.: 437,641, filed Oct. 19, 1982; 778,656, filed Sept. 23, 1985; 895,629, filed Aug. 11, 1986; 908,535, filed Sept. 16, 1986, and 916,923, filed Oct. 9, 1986. In the event that a basic material is used during the hydrolysis of the amine which would act as a trimerization catalyst, and if that basic material is not removed once the hydrolysis reaction is complete, then an acidic material, such as, benzoyl chloride, should be added either before or shortly after addition of the amine to the isocyanate.

The most preferred polyamines contain from 2 to 4 amino groups and have molecular weights of from 350 to 6000.

The isocyanate used to prepare the prepolymer is an isocyanate mixture comprising: (a) from 50 to 100% by weight of diphenylmethane diisocyanates of which from 3 to 50% by weight consists of the 2,2'- and 2,4'-isomers, and (b) the balance being polyphenylmethylene polyisocyanates, with the proviso that if said mixture comprises from 95 to 100% by weight of diphenylmethane diisocyanates, at least 15% by weight of said diisocyanate consists of the 2,2'- and 2,4'-isomers.

Typically, the reactants are mixed and reacted at temperatures of from about 40° C. to about 130° C., and preferably, at temperatures of less than 120° C.

The liquid products of the present invention are suitable for preparation of a wide variety of polyurethane products.

The invention is further illustrated but is not intended to be limited by the following examples in which all parts and percentages are by weight unless otherwise specified.

EXAMPLES

In the Examples which follow, the following materials were used:

ATP-A: Formed from a prepolymer that was prepared from 1 equivalent of 2,4-toluene diisocyanate and 0.5 equivalent of a polyol (made from the reaction of a mixture of glycerine and 1,2-propylene glycol (molar ratio 1:1) with propylene oxide that resulted in an OH number of about 33) which upon hydrolysis gave an amino terminated polyether having an amine number of 32.8 and a functionality of 2.5.

ATP-B: Formed from a prepolymer that was prepared from 1 equivalent of 2,4-toluene diisocyanate and 0.5 equivalent of a polyol (made from the reaction of a mixture of glycerine and 1,2-propylene glycol (molar ratio 1:1) with propylene oxide that resulted in an OH number of about 50) which upon hydrolysis gave an amino terminated polyether having an amine number of 45.0 and a functionality of 2.5.

ATP-C: Formed from a prepolymer that was prepared from 1 equivalent of 2,4-toluene diisocyanate and 0.5 equivalent of a polyol (made from the reaction of glycerine with propylene oxide that resulted in an OH number of about 32) which upon hydrolysis gave an amino terminated polyether having an amine number of 30 and a functionality of 3.0.

ATP-D: Formed from a prepolymer that was prepared from 1 equivalent of 2,4-toluene diisocyanate and 0.5 equivalent of a polyol (made from the reaction of glycerine with propylene oxide that resulted in an OH number of about 49) which upon hydrolysis gave an amino terminated polyether having an amine number of 46.3 and a functionality of 3.0.

ATP-E: Formed from a prepolymer that was prepared from 1 equivalent of 2,4-toluene diisocyanate and 0.5 equivalent of a polyol (made from the reaction of 1,2-propylene glycol with propylene oxide that resulted in an OH number of about 112) which upon hydrolysis gave an amino terminated polyether having an amine number of 77.2 and a functionality of 2.0.

ATP-F: Formed from a prepolymer that was prepared from 1 equivalent of 2,4-toluene diisocyanate and 0.5 equivalent of a polyol (made from the reaction of 1,2-propylene glycol with propylene oxide that resulted in an OH number of about 28) which upon hydrolysis gave an amino terminated polyether having an amine number of 25.6 and a functionality of 2.0.

MDI x/y: where x represents the total of diisocyanate in the isocyanate and where y represents the total 2,2'- and 2,4'- isomers of diisocyanatodiphenylmethane in the isocyanate. When x is less than 100 that difference is made up with the higher homologs of diisocyanatodiphenylmethane.

utes. The resulting reaction mixture was cooled to room temperature. After 24 hours at room temperature the product was a slightly cloudy liquid having an NCO content of 27.3% by weight and a viscosity at 25° C. of 1770 mPa.s. After storage at room temperature for 63 days no change was observed.

Table I gives the results using ATP's A, B, C, D, E, and F using the identical procedure described above.

TABLE I

| EXAMPLE | ATP | PARTS ATP | MDI ISOCYANATE | PARTS ISO | APPEARANCE | % NCO | VISCOSITIES, at 25° C., mPa.s |
|---|---|---|---|---|---|---|---|
| 2 | B | 16.5 | 83/35.5 | 50 | dark/cloudy | 23.8 | 2200 |
| 3 | A | 17.0 | 83/35.5 | 50 | dark/clear | 23.3 | 6500 |
| 4 | D | 16.5 | 83/35.5 | 50 | dark/clear | 23.1 | 7700 |
| 5 | B | 16.0 | 78/25 | 50 | light/clear | 23.8 | 2700 |
| 6 | A | 16.5 | 78/25 | 50 | light/clear | 23.8 | 4400 |
| 7 | B | 32.0 | 78/21 | 100 | light/cloudy | 23.8 | 2400 |
| 8 | D | 32.0 | 78/21 | 100 | light/cloudy | 23.7 | 5800 |
| 9 | B | 15.0 | 60/21 | 50 | dark/clear | 21.3 | 11,000 |
| 10 | B | 15.0 | 65/21 | 50 | dark/clear | 23.0 | 6800 |
| 11 | B | 15.0 | 68/21 | 50 | dark/clear | 23.5 | 4700 |
| 12 | B | 15.0 | 72/21 | 50 | dark/clear | 23.9 | 3800 |
| 13 | D | 16.0 | 78/25 | 50 | light/clear | 23.4 | 6000 |
| 14 | D | 15.0 | 65/21 | 50 | light/clear | 23.2 | 8000 |
| 15 | D | 16.0 | 78/25 | 50 | light/clear | 23.2 | 7000 |
| 16 | B | 32.6 | 100/43 | 100 | light/cloudy | 24.2 | 600 |
| 17 | C | 36.5 | 100/43 | 100 | light/cloudy | 23.8 | 1700 |
| 18 | A | 36.5 | 100/43 | 100 | light/cloudy | 23.8 | 1350 |
| 19 | D | 36.5 | 100/43 | 100 | light/cloudy | 23.5 | 1650 |
| 20 | E | 32.2 | 100/43 | 100 | light/cloudy | 23.6 | 4100 |
| 21 | B | 70.5 | 100/30 | 200 | light/cloudy | 23.5 | 2600 |
| 22 | B | 65.0 | 78/25 | 200 | light/clear | 23.4 | 22,800 |
| 23 | B | 70.5 | 100/43 | 200 | light/cloudy | 23.9 | 5730 |
| 24 | F | 74.0 | 100/30 | 200 | light/cloudy | 23.3 | 1560 |

All formulations contain 0.2% by weight benzoyl chloride.

EXAMPLE 25

70.5 parts of ATP-B was added within 1 minute to 200 parts of MDI 80/17 at 55° C. with good mixing. One minute after the addition of ATP-B was complete 0.4 parts of benzoyl chloride was added. The reaction mixture was then heated to 120° C. over a 3 minute period and held at 120° C. for 20 minutes. The reaction mixture was then cooled to room temperature. After 24 hours at room temperature the product was a dark, clear liquid having an NCO content of 22.7% by weight and a viscosity at 25° C. of 3670 mPa.s. After storage at room temperature for 23 days, no change was observed.

Table II gives the results using ATP's B and F using the identical procedure described above.

TABLE II

| EXAMPLE | ATP | PARTS ATP | MDI ISOCYANATE | PARTS ISO | APPEARANCE | % NCO | VISCOSITIES, at 25° C., mPa.s |
|---|---|---|---|---|---|---|---|
| 26 | B | 71.8 | 100/20 | 204 | light/cloudy | 23.1 | 1045 |
| 27 | B | 69.4 | 90/3 | 197 | dark/cloudy | 23.0 | 2060 |
| 28 | B | 70.5 | 90/35 | 200 | light/clear | 23.0 | 1810 |
| 29 | B | 35.0 | 70/19 | 200 | dark/clear | 26.2 | 790 |
| 30 | B | 70.5 | 50/3 | 200 | dark/clear | 21.7 | 41,300 |
| 31 | B | 35.0 | 50/17 | 200 | dark/clear | 26.1 | 3640 |
| 32 | B | 35.0 | 65/21 | 200 | dark/clear | 26.1 | 1360 |
| 33 | B | 35.0 | 70/3 | 200 | dark/clear | 26.7 | 670 |
| 34 | B | 35.0 | 50/3 | 200 | dark/clear | 26.1 | 4100 |
| 35 | B | 35.0 | 60/11 | 200 | dark/clear | 26.8 | 1770 |
| 36 | F | 82.0 | 50/3 | 200 | dark/clear | 21.9 | 8820 |
| 37 | F | 81.5 | 80/27 | 200 | dark/clear | 22.4 | 1360 |

All formulations contain 0.2% by weight benzoyl chloride.

EXAMPLE 1

35 parts of ATP-B was added within 1 minute to 200 parts of MDI 90/35 at 55° C. with good mixing. One minute after the addition of ATP-B was complete, 0.4 parts of benzoyl chloride was added and the reaction mixture was stirred at 55° C. for an additional 30 min-

COMPARISON EXAMPLES

Jeffamine D-400—A poly (propylene oxide) based aliphatic, primary polyamine with a functionality of about 2 and a molecular weight of about 400, available from Texaco Chemical Company.

Jeffamine T-5000—A poly (propylene oxide) based aliphatic, primary polyamine with a functionality of about 3 and a molecular weight of about 5000, available from Texaco Chemical Company.

70.8 grams of an MDI 100/43 were heated to 80° C. While vigorously stirring, Jeffamine T-5000 was added drop-wise, which resulted in the immediate formation of an insoluble gel. The reaction was halted.

80.8 grams of an MDI 100/43 were heated to 80° C. While vigorously stirring, Jeffamine D-400 was added drop-wise, which resulted in the immediate formation of an insoluble, yellowish gel. The reaction was halted.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A liquid, storage-stable isocyanate prepolymer having an isocyanate group content of from 10 to 30% by weight, prepared by reacting:

i) a polyamine containing at least two aromatically bound primary amino groups prepared by hydrolyzing an isocyanate compound having an isocyanate group content of from 0.5 to 40% by weight, with ii) an isocyanate mixture comprising a) from 50 to 100% by weight of diphenylmethane diisocyanates of which from 3 to 50% by weight consist of the 2,2'- and 2,4'-isomers, and b) the balance being polyphenylpolymethylene polyisocyanates, with the proviso that if said mixture comprises from 95 to 100% by weight of diphenylmethane diisocyanate, at least 15% by weight of said diisocyanate consisting of the 2,2'- and 2,4'-isomers.

2. The prepolymer of claim 1 wherein said polyamine is prepared by reacting a polyether containing from two to four hydroxyl groups with an excess of an aromatic polyisocyanate and then converting the isocyanate groups to amino groups by hydrolysis.

3. The prepolymer of claim 2 wherein said polyamine contains from 2 to 4 amino groups and has a molecular weight of from 350 to 6000.

* * * * *